United States Patent [19]

Nowell

[11] Patent Number: 4,799,505
[45] Date of Patent: Jan. 24, 1989

[54] EARTHQUAKE TRIGGFERED GAS VALVE

[76] Inventor: Homer Nowell, 1311 Breckenridge St., San Leandro, Calif. 94579

[21] Appl. No.: 196,602

[22] Filed: May 20, 1988

[51] Int. Cl.[4] .................................. F16K 17/36
[52] U.S. Cl. ......................................... 137/38
[58] Field of Search .................. 137/38, 39, 43, 45

[56] References Cited

U.S. PATENT DOCUMENTS 4,336,818  6/1982  Dauvergne .................... 137/38

FOREIGN PATENT DOCUMENTS 2727571  12/1978  Fed. Rep. of Germany ........ 137/38
167577   10/1982  Japan ................................... 137/38

Primary Examiner—Robert G. Nilson
Attorney, Agent, or Firm—Linval B. Castle

[57] ABSTRACT

An earthquake triggered gas valve in which the valve member on an axial valve rod is forced open by a ball propped between the end of the valve rod and a retractable post in the conical floor of the valve outlet chamber. The ball is at least partially filled with a dense fluid such as mercury which has a inertia that will oppose that of an earthquake moved valve housing. The ball will thus be dislodged to permit the valve to close. The valve is easily reopened by lowering the retractable post to reset the ball which is then lifted to raise the valve rod and valve.

9 Claims, 1 Drawing Sheet

EARTHQUAKE TRIGGFERED GAS VALVE

BRIEF SUMMARY OF THE INVENTION

This invention relates generally to gas valves and in particular to a manually resettable valve that will automatically close from the shock of an earthquake.

While severe earthquakes cause considerable structural damage to buildings, most of the complete destruction to buildings is caused by fire resulting from broken and shorted electrical wiring and broken gas pipes. Earthquake broken water mains then eliminate the means for extinguishing these fires.

Present day building codes and modern electrical circuit breaker devices have substantially reduced fire dangers from earthquake shorted wiring. There remains a need for a very reliable and inexpensive gas valve that will close all gas flow into a building in response to an earthquake shock and which can easily and quickly be reopened after it is determined that there are no gas leaks. The invention disclosed herein describes such a gas valve.

Briefly described, the earthquake triggered gas valve includes a gas inlet chamber and outlet chamber separated by a valve seat and valve spring biased toward closure. The valve is mounted on an axial rod the end of which is propped upon a hollow ball to hold the valve open. The ball is partially filled with a heavy fluid such as mercury and stands on a concave base that is manually retractable into the housing. When the mercury weighted ball is jolted from its base by a shock, the axial rod drops to force closure of the valve and instant stoppage of gas flow. The valve is reopened by retracting the concave base to enable the ball to be rebalanced on it and then raising the base will again lift and open the valve.

BRIEF DESCRIPTION OF THE DRAWINGS

In the drawings which illustrate the preferred embodiment of the invention.

DETAILED DESCRIPTION OF THE INVENTION

Figure 1:
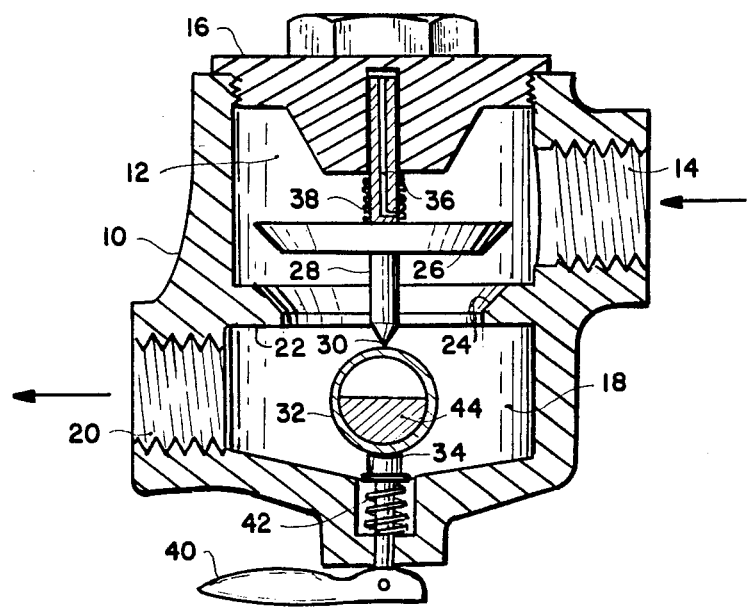
FIG. 1 is a sectional view illustrating the shock triggerable gas valve in a normally open position.

The sectional view of FIG. 1 shows a housing 10 having an upper or inlet chamber 12 with inlet port 14 threaded to receive a conventional gas pipe, and having a threaded cap member 16 which enables access to the interior of the housing. Located below the inlet chamber 12 is a lower or outlet chamber 18 having an outlet port 20 threaded to receive an outlet gas pipe and a funnel shaped floor slanted toward the axial center of the chamber. Separating the inlet chamber 12 and outlet chamber 18 is a partition 22 having therein a conically shaped valve seat 24 ground to mate with an inverted truncated cone valve 26.

The valve 26 is mounted on an axial valve shaft 28 which extends above the top surface of the valve into the inlet chamber 12 and below its bottom surface into the outlet chamber 18 where in terminates at its end 30 which may be pointed, as shown, or blunt or concave depending upon the desired shock sensitivity of the unit; that is, the amplitude of a shock needed to dislodge a ball 32 normally standing on a manually retractable concave post 34 that is spring biased up to force contact of the ball with the shaft end 30.

The upper end of the shaft 28 extending into the inlet chamber 12 slideably fits within a hole in the threaded cap member 16, the thickness of the member and length of the hole being adequate to support the shaft when the valve 26 is closed in its valve seat 24 or raised by the the ball 32 between the shaft end 30 and its base post 34. Because of the close slideable fit between the shaft 28 and hole in the cap member 16, movement of the shaft within the hole would be restricted by air pressure and vacuum; therefore, the upper end of the shaft 28 must have an axial air vent 36 between the upper end of the shaft and one of the inner chambers of the gas valve. If desired, the shaft 28 may be tubular throughout its entire length to provide the necessary venting.

During normal operation the valve 26 is open and suspended above the valve seat 24 so that gas may freely flow from the inlet port 14, through the open valve and through the outlet port 20, as shown in FIG. 1. The valve 26 is maintained in this raised position by ball 32 lifting the end 30 of the valve shaft 28 and valve. To assure a rapid closing of the valve when the ball is dislodged by some shock or vibration, the valve 26 is biased downward by a spring 38 around the shaft 28 and compressed between the lower surface of the cap member 16 and the top surface of valve 26.

The ball 32 which should be hollow and spherical, stands on a concave seat or post 34 which is manually retractable for remounting the ball after it has been dislodged. The post diameter is relatively small and can retract into an axially located hole recessed in the interior floor of the housing and thence through an annular gas seal (not shown) and through the housing to a manually operable reset cam handle 40 on the exterior of the housing. In normal operation, the ball 32 resting on the concave post 34 must be urged upward against the ball 32, the valve shaft 28, and must also overcome the downward bias of the spring 38. Therefore, the post 34 is forced upward by a strong spring 42, the strength of which may be considered another factor in determining the sensitivity of the valve assembly.

For proper operation, it is important that the hole in the cap member 16, the shaft 28, the valve 26, its valve seat 24 and the concave ball post 34 be coaxially aligned within the housing 10.

The ball 32 is preferably hollow and contains a low viscosity, dense fluid 44 that will remain fluid at the lowest temperatures to which the valve assembly will be exposed. The fluid, such as mercury, need only fill about half the interior volume of the ball so that it may readily move within the ball. Then, when the valve assembly including the ball 32 is forced to move in a direction by an earthquake shock, the heavy fluid 44 within the ball will have an inertia that opposes the movement of the remaining assembly and the ball will snap out from its position between the end 30 of the valve shaft 28 and the concave post 34 as shown in FIG. 2.

Figure 2:
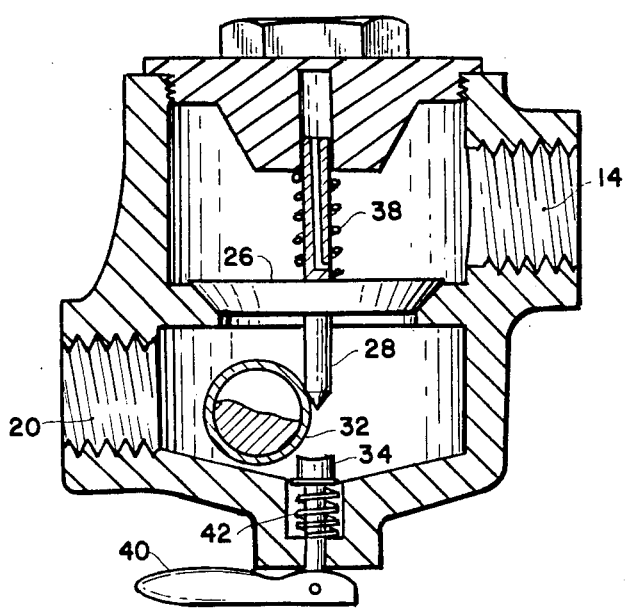
FIG. 2 is a sectional view illustrating the valve closed by a removal of the fluid filled ball from its base.

In FIG. 2, the ball 32 has been dislodged from between the shaft 28 and the concave post 34 and the valve shaft 28, no longer being supported on the ball, is forced downward by both the action of gravity and the spring 38 until the valve 26 engages the valve seat 24 to close the passage between the inlet port 14 and outlet port 20.

Figure 3:
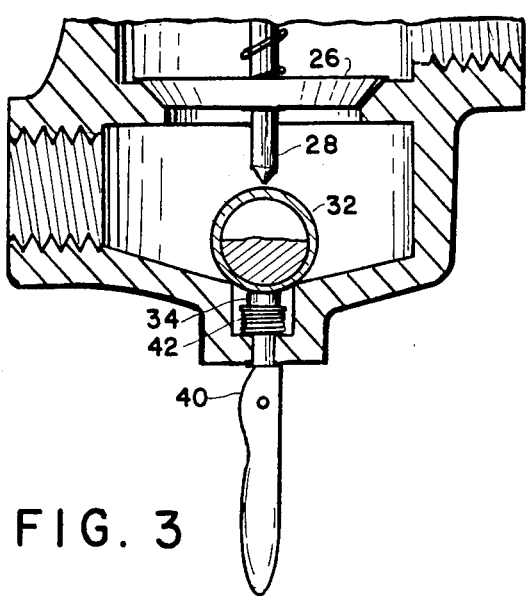
FIG. 3 is a sectional view of the lower section of the valve illustrating the mechanism for manually rebalancing of the ball prior to reopening the valve.

To reset the valve assembly it is only necessary to reposition the ball 32 between the concave post 34 and the valve shaft 28. This is accomplished by movement of the cam handle 40 as shown in FIG. 3. Such movement draws the concave post 34 downward against the strong spring 42 to a position at which the funnel shaped floor of the outlet chamber 18 forces the ball 32 to gravitate to the axial center of the chamber and directly over the concave post 34. The cam handle 40 is then carefully rotated back to lift the concave post 34 and the ball 32 to a position at which the ball lifts the valve shaft 28 against the downward bias of the spring 38 to reopen the valve 26 and into the position illustrated in FIG. 1.

Having thus described my invention, what I claim is:

1. A gas valve automatically closed from a normally open position by a shock, said gas valve comprising:
    a housing having having a gas inlet chamber and outlet chamber, said chambers being separated by a partition, said outlet chamber having a floor;
    a valve seat in an opening in said partition;
    a valve member mounted on a valve rod passing through the center of the valve seat opening and having a first end terminating in said outlet chamber, said valve member positioned to engage said valve seat to seal the opening between said inlet and outlet chambers; and
    a hollow ball positioned between the floor of said outlet chamber and the first end of said valve rod for forcing said valve member out of said valve seat and to open the gas valve, said hollow ball containing a fluid having an inertia that will oppose a shock produced movement of said housing.

2. The valve claimed in claim 1 wherein said fluid is mercury.

3. The valve claimed in claim 1 wherein the inlet chamber in said housing includes a roof having an opening coaxial with said valve member and said valve rod, said valve rod extending into said inlet chamber and into said roof opening, said valve rod having a longitudinal hole at least partially therethrough for pressure and vacuum relief of said valve rod during movement of said rod in said opening.

4. The valve claimed in claim 3 further including spring means for urging closure of said valve member into said valve seat.

5. The valve claimed in claim 3 wherein the roof of said inlet chamber is a threaded cap.

6. The valve claimed in claim 3 further including means in the floor of said outlet chamber for repositioning said ball after its removal from the first end of said valve rod.

7. The valve claimed in claim 6 wherein said the floor of said outlet chamber is sloped toward a point under the first end of said valve rod and said means includes a concave seat coaxial with said first end and retractable in the floor of said outlet chamber.

8. The valve claimed in claim 7 wherein said concave seat is spring biased to force said ball and said valve rod to urge said valve member member out of said valve seat.

9. The valve claimed in claim 8 wherein said concave seat is the termination of a post extending through the floor of said outlet chamber to a manually operable retraction handle.

* * * * *